(12) United States Patent
Rogge et al.

(10) Patent No.: US 9,821,855 B2
(45) Date of Patent: Nov. 21, 2017

(54) MOTOR VEHICLE BODY WITH FILLER PIECE

(71) Applicant: GM GLOBAL TECHNOLOGY OPERATIONS LLC, Detroit, MI (US)

(72) Inventors: Andreas Rogge, Ruesselsheim (DE); Alexander Mueller, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 12 days.

(21) Appl. No.: 15/149,832

(22) Filed: May 9, 2016

(65) Prior Publication Data

US 2016/0325697 A1 Nov. 10, 2016

(30) Foreign Application Priority Data

May 8, 2015 (DE) .................. 10 2015 005 895

(51) Int. Cl.
| | |
|---|---|
| *B60J 7/00* | (2006.01) |
| *B62D 25/04* | (2006.01) |
| *B62D 25/12* | (2006.01) |
| *B62D 25/16* | (2006.01) |
| *B60R 13/04* | (2006.01) |

(52) U.S. Cl.
CPC .............. *B62D 25/04* (2013.01); *B60R 13/04* (2013.01); *B62D 25/12* (2013.01); *B62D 25/16* (2013.01)

(58) Field of Classification Search
CPC ... B60R 21/213; B60R 13/025; B60R 21/232; B60R 2021/161; B62D 25/025; B62D 25/04; B60J 5/0402; Y10T 29/49826; H05K 7/20572

USPC ..... 296/193.06, 192, 193.04, 193.05, 203.03
See application file for complete search history.

(56) References Cited

U.S. PATENT DOCUMENTS

| | | | | |
|---|---|---|---|---|
| 6,467,834 | B1 * | 10/2002 | Barz ..................... | B62D 25/04 296/187.02 |
| 6,644,725 | B2 * | 11/2003 | Braitmaier ............ | B62D 25/04 296/203.03 |
| 6,938,950 | B2 * | 9/2005 | Nagafuchi ........... | B62D 25/082 296/187.09 |
| 7,735,870 | B2 * | 6/2010 | Kosaka ................ | B62D 21/152 280/784 |
| 8,348,321 | B2 * | 1/2013 | Yamazaki .............. | B60R 13/04 296/1.08 |

(Continued)

FOREIGN PATENT DOCUMENTS

| | | |
|---|---|---|
| DE | 10063214 A1 | 7/2001 |
| JP | H09315340 A | 12/1997 |

(Continued)

OTHER PUBLICATIONS

Great Britain Patent Office, Great Britain Search Report for Great Britain Application No. 1606594.8, dated Sep. 15, 2016.

(Continued)

*Primary Examiner* — Kiran B Patel
(74) *Attorney, Agent, or Firm* — Lorenz & Kopf, LLP

(57) ABSTRACT

A motor vehicle body includes an A-pillar panel, an outer skin body panel, which together with an edge of the A-pillar panel delimits a gap. A windshield is adjacent to a longitudinal edge of the A-pillar panel. A filler piece has a first portion which fills out the gap and a second portion which conceals a gap between the longitudinal edge of the A-pillar panel and the windshield.

12 Claims, 3 Drawing Sheets

(56) References Cited

U.S. PATENT DOCUMENTS

| | | | | |
|---|---|---|---|---|
| 8,371,642 B2* | 2/2013 | Baccouche | ............ | B62D 21/15 |
| | | | | 296/187.12 |
| 8,491,043 B2 | 7/2013 | Yamagishi et al. | | |
| 8,662,568 B2* | 3/2014 | Weigl | ................... | B62D 25/145 |
| | | | | 296/187.09 |
| 8,888,173 B2* | 11/2014 | Nydam | ................ | B62D 25/025 |
| | | | | 296/187.12 |
| 8,894,133 B2* | 11/2014 | Chai | ....................... | B62D 25/04 |
| | | | | 296/203.02 |
| 8,926,005 B2* | 1/2015 | Barz | ...................... | B62D 25/04 |
| | | | | 296/187.02 |
| 9,132,865 B2* | 9/2015 | Chung | ................... | B62D 25/04 |
| 9,180,917 B1* | 11/2015 | Wu | ...................... | B62D 27/023 |
| 9,487,239 B2* | 11/2016 | Schnug | ................. | B62D 25/04 |
| 2007/0296238 A1 | 12/2007 | Kinoshita et al. | | |
| 2013/0076073 A1 | 3/2013 | Tanaka | | |

FOREIGN PATENT DOCUMENTS

| | | |
|---|---|---|
| JP | 2004148887 A | 5/2004 |
| JP | 2006192975 A | 7/2006 |
| JP | 2008087616 A | 4/2008 |
| WO | 2005102781 A1 | 11/2005 |

OTHER PUBLICATIONS

German Patent Office, German Search Report for German Application No. 102015005895.9, dated Mar. 11, 2016.

* cited by examiner

MOTOR VEHICLE BODY WITH FILLER PIECE

CROSS-REFERENCE TO RELATED APPLICATION

This application claims priority to German Patent Application No. 102015005895.9, filed May 8, 2015, which is incorporated herein by reference in its entirety.

TECHNICAL FIELD

The present disclosure pertains to a motor vehicle body with an outer skin formed from multiple body panels. These body panels may be mounted to a supporting structure of the body in a fixed or moveable manner. A filler piece is provided between a fixed panel and a movable panel or between two fixed panels.

BACKGROUND

Filler bodies can simplify the assembly of the motor vehicle body, fix example in that they conceal unsightly fastening portions of outer skin body panels. However, the filler pieces themselves also contribute to the assembly effort since each of these has to be fastened and before a filler piece can be fastened, a support has to be created on the body which is capable of providing the filler piece with a secure hold.

SUMMARY

The present disclosure is directed to a motor vehicle body with an outer skin that is joined from multiple body panels such as for example fenders, windshields and back windows. These body panels may be mounted to a supporting structure of the body in a fixed manner, such as fenders, windshields and back windows, or in a moveable manner, such as engine hood, trunk lids and doors. In order to offset manufacturing tolerances and in order to avoid that the body panels at their edges nib against one another because of different heat expansion coefficients, the body panels are mostly spaced from one another by a gap. With some of these gaps it is customary to fill these out with a filler piece in order for example to keep rain water away from the interior of the body or in order to conceal vehicle parts that are located behind the gap. For example, there are motor vehicle models which include a filler piece between a front or lower edge of an A-pillar panel and an engine hood adjoining thereon, or in the case of a gap between the A-pillar panel and a windshield, in particular near its lower edge, is closed by a filler piece. The present disclosure provides a motor vehicle body with which the assembly effort of filler pieces is reduced. In an embodiment, a motor vehicle body includes an A-pillar panel, an outer skin body panel, which together with an edge of the A-pillar panel delimits a gap. A windshield is adjacent to a longitudinal edge of the A-pillar panel. A filler piece includes a first portion configured to fill out the gap and a second portion configured to conceal a gap between the longitudinal edge and the windshield. Accordingly, a single filler piece can fulfil the tasks that are conventionally assumed by multiple filler pieces, and the assembly effort is accordingly reduced corresponding to the number of filler pieces saved in this manner.

Typically, the gap is located at a front lower end of the A-pillar panel. Since the A-pillar panel delimits both the gap to be filled out and also the gap to be concealed, the filler piece should preferably be positively engaged on the A-pillar panel in order to minimize the influence of production tolerances on the positioning of the filler piece. A positive engagement can be formed by at least one engagement protrusion of the filler piece and an opening of the A-pillar panel receiving the engagement protrusion. Since the A-pillar panel generally consists of flat material, the creation of an opening therein requires little effort. On the filler piece by contrast, when the same is injection-molded from plastic, the engagement protrusion is easily realizable. In particular, the opening can be formed in a flange that is angled off on the edge of the A-pillar panel.

The first portion of the filler piece may include a U or angular profile having a first leg which butts up against the flange and a second leg extending from the flange in the direction of the outer skin body panel located on the other side of the gap opposite the flange. The second leg can extend, seen from outside the motor vehicle body, to behind the outer skin body panel. Accordingly, the gap is closed at least opaquely without a fixed contact to the outer skin body panel being necessary and any production tolerances between the A-pillar panel and the outer skin body panel rendering the fitting of the filler piece difficult.

The second portion of the filler body is fixed on the longitudinal edge preferably by way of gluing. The strength of such a bond is only little dependent on the precision of the positioning of the second portion on the longitudinal edge so that production tolerances are also not very critical here.

Preferably, the A-pillar panel includes a flange which extends along its longitudinal edge and to which the bond adheres. The bond can practically be formed by a double-sided adhesive tape. A side of this adhesive tape can be glued to the filler piece beforehand while the other side can be protected by a covering foil for as long as the filler body is being mounted to the motor vehicle body.

Filling out the gap with a filler piece is particularly practical when the outer skin body panel, which is located opposite the A-pillar panel, is an engine hood and the filler piece can conceal parts of a hood hinge. The filler piece however could also be provided between A-pillar panel and a fender which towards the front and towards the bottom adjoins thereon.

The filler piece is preferably molded in one piece. In order to be able to realize the possibly complex shape of the filler piece with a simple built mold it can be practical to provide a foil hinge between a first and second portion of the filler piece.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
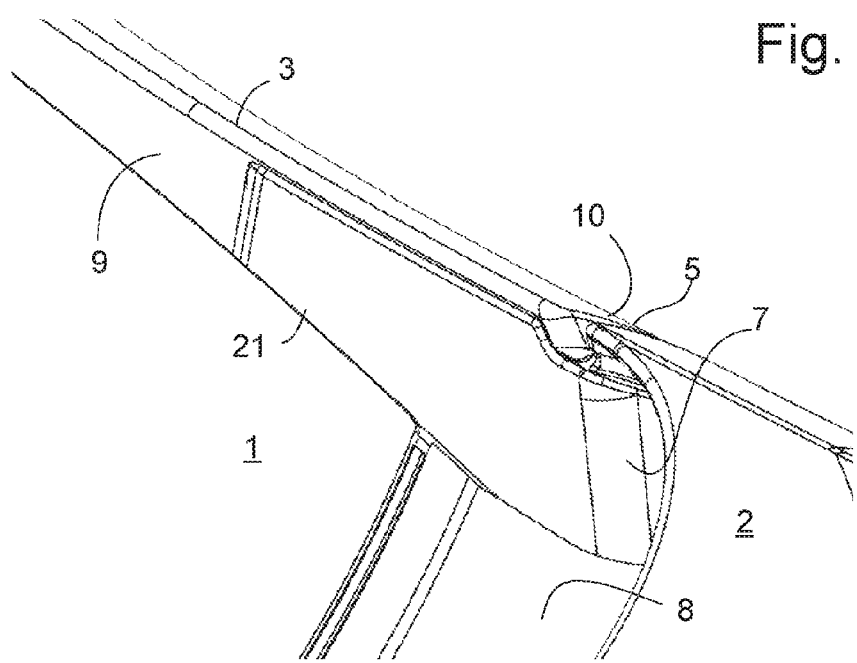
FIG. 1 is a detail of a motor vehicle body.
Figure 2:
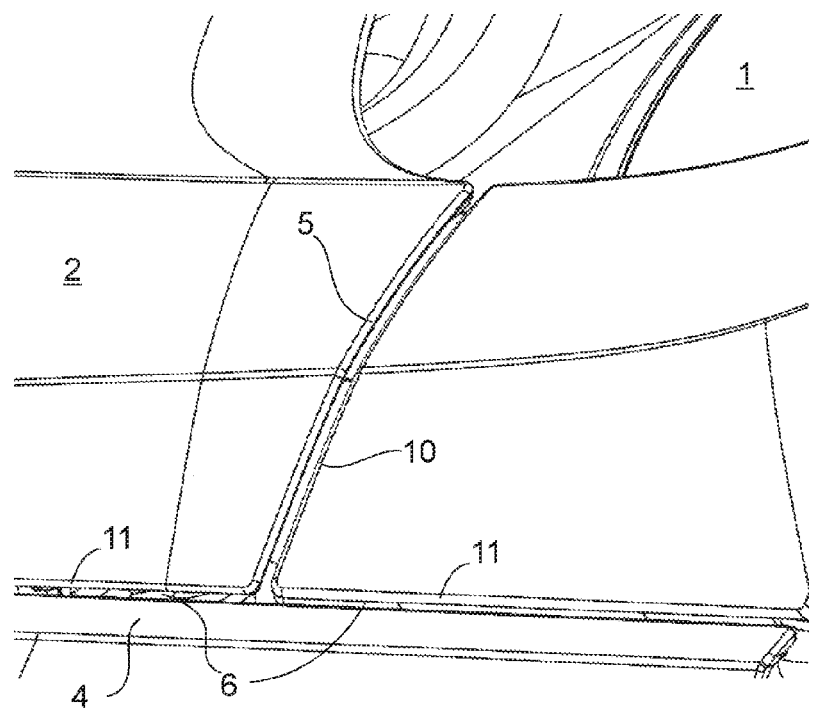
FIG. 2 illustrates the detail of FIG. 1 from another perspective.

FIG. 1 shows a lower front corner of a windshield 1 of a motor vehicle body, a rear corner of an engine hood 2 following the windshield 1 and a part of an A-pillar 3, in a perspective view, seen across the engine hood 2. FIG. 2 shows the same detail from a substantially opposite direction wherein in each case below the A-pillar panel 3 and the engine hood 2 a piece of a front fender 4 is still visible.

Gaps 5, 6 extend in the view of FIG. 2 between a front edge 10 of the A-pillar panel 3 and the engine hood 2 or between lower edges 11 from A-pillar panel 3 and engine hood 2 on the one hand and the fender 4 on the other hand. The gap 5 is filled out by a filler piece 7 that is injection-molded from plastic which, as is visible in FIG. 1, forms a side wall of a water box 8 at the foot of the windshield 1 and from there extends to a flange 9 of the A-pillar panel 3, which rises substantially vertically and orientated in vehicle longitudinal direction on the edge of the windshield 1.

Figure 3:
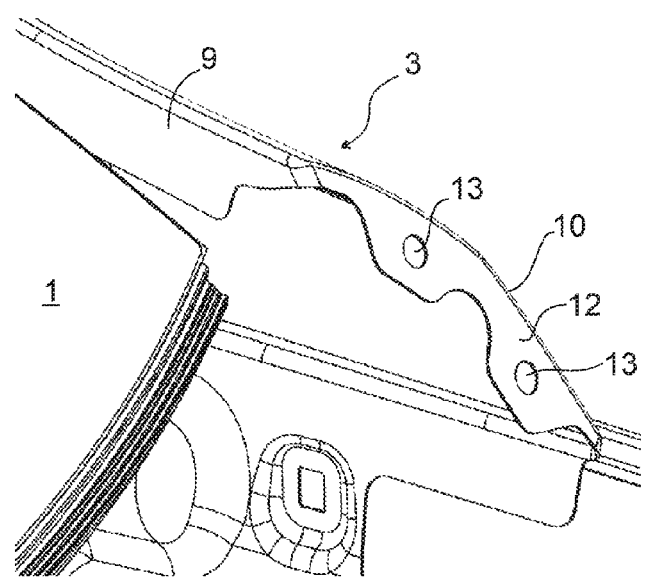
FIG. 3 illustrates the lower front end of an A-pillar panel.

FIG. 3 shows, in the same perspective as in FIG. 1, the lower edge of the windshield 1 and the A-pillar panel 3 adjoining thereon without the engine hood 2 and without the filler piece 7. On the front edge 10 of the A-pillar panel 3 a flange 12 is angled into the vehicle interior. The flange 12 is provided with two openings 13.

Figure 4:
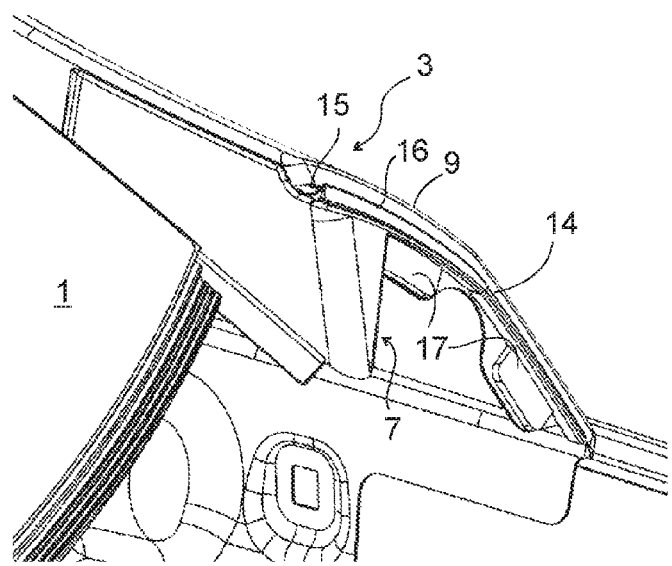
FIG. 4 illustrates the A-pillar panel with filler piece mounted thereon.

FIG. 4 shows the same detail of FIG. 3, however with filler body 7 mounted on the A-pillar panel 3. The filler piece 7 includes a portion 14 in the form of a flat angle profile with a leg 15 butting up against the flange 12 and a leg 16, which stands away obliquely from the flange 12 in order to bridge the gap 5 as far as to the rear edge of the engine hood 2 that is not shown in FIG. 4.

Figure 5:
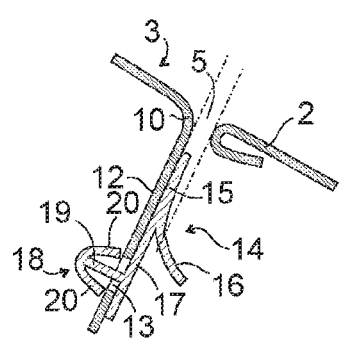
FIG. 5 illustrates a schematic section through the front edge of the A-pillar panel and the filler piece engaged thereon.

FIG. 5 shows a schematic cross section through the portion 14 that is mounted on the flange 12 and the rear edge of the engine hood 2. The leg 16 engages, seen from the outside, as far as to behind the engine hood 2 thereby barring any insight to the engine compartment for as long as the hood 2 is in the closed position.

FIG. 4 shows two fastening feet 17 of the filler piece 7, of which one is visible in section in FIG. 5. The fastening feet 17 each extend in extension of the leg 15, and butting up flat against the flange 12, each carry a fastening clip 18. The fastening clips each have a stiff shank 19 emanating from the fastening foot 17 and two elastic wings 20, which diverge arrow-like from the tip of the shank 19 in order to be pressed against one another when the fastening clip 18 is pushed into one of the openings 13 and by expanding again after passing the opening 13, engage the filler piece 7 on the openings 13 of the flange 12.

Molded to the upper end of the elongated portion 14 is a plate-shaped portion 21 in one piece which, as is evident by comparing FIGS. 4 and 3, engages into a gap between the flange 9 and the windshield 1. The plate-shaped portion 21 butts up against the flange 9 over a large area and is fastened to the same by gluing. A web 22 which stands away from a lower edge of the plate-shaped portion 21 engages below the windshield 1.

Figure 6:
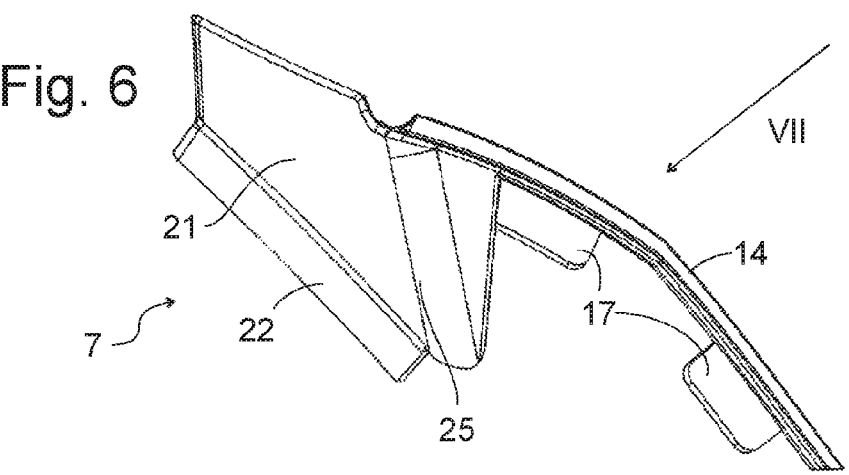
FIG. 6 illustrates a first perspective view of the filler body.
Figure 7:
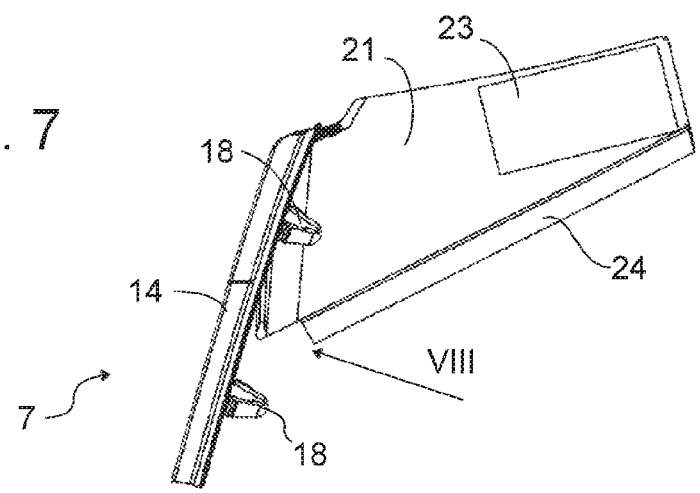
FIG. 7 illustrates a second perspective view.
Figure 8:
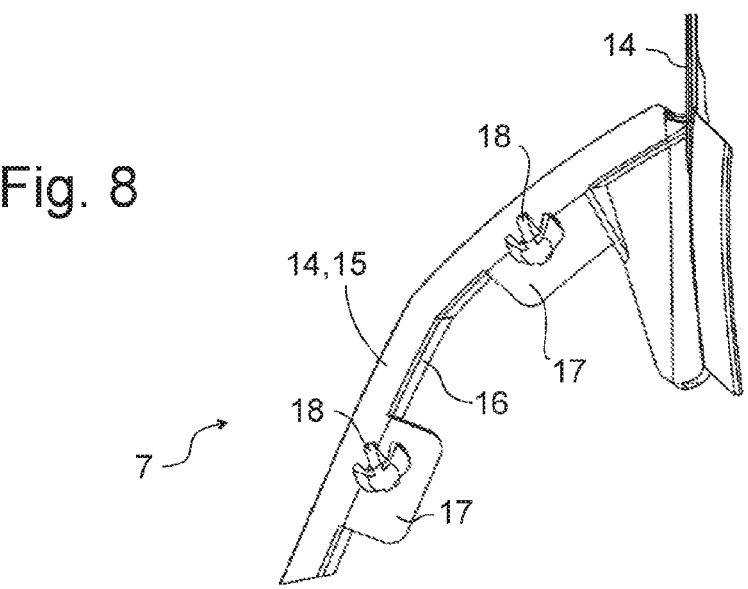
FIG. 8 illustrates a third perspective view of the filler piece.

The FIGS. 6-8 show the filler piece 7 for illustration of its shape in various perspective views. The perspective of FIG. 6 is similar to those of FIG. 4 and clearly shows the plate-shaped portion 21 and the elongated portion 14 with the fastening feet 17; the fastening clips 18 are hidden behind the fastening feet in the perspective of FIG. 6.

FIG. 7 shows the filler piece 7 from a view direction which approximately corresponds to the arrow VII from FIG. 6. Visible is the surface of the plate-shaped portion 14 which in the mounted state faces the flange 9 with a piece of double-sided adhesive tape 23 adhering thereon. The adhesive tape 23 can be directly glued onto the portion 21 following the injection-molding of the filler piece 7 and be protected by cover paper, which is only removed immediately before the filler piece 7 is installed in the vehicle.

A second web 24 extends parallel to web 22 on the opposite surface of the plate-shaped portion 14. The two webs 22, 24 can be embodied elastically and support the filler piece 7 on a surface of the supporting structure located below, for example the upper edge of a front wall extending between engine compartment and passenger cells.

The view direction of FIG. 7 is parallel to the plane of the leg 15 which for this reason is merely visible as a narrow strip; clearly visible are the legs 16 and the fastening clips 18, which in each case on opposite sides project from the leg 15.

FIG. 8 shows the filler piece 7 seen from a direction that is approximately perpendicular to the leg 15 corresponding to the arrow VIII in FIG. 7.

In order to be able to keep the molds used for injection-molding the filler piece simple, it can be practical to provide a film or foil hinge on the filler piece 7, which makes possible adapting its shape prior to the installation in the vehicle. Fastening means for anchoring the filler piece on the vehicle should be provided on both sides of such a foil hinge, when for example such a foil hinge is provided along an edge 25 between the portions 14 and 21, the one portion 14 can be fixed by way of engagement with the help of the fastening clips 18, the other 21 through gluing by means of the adhesive tape 23, and a secure seat of the entire filler piece 7 be ensured.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle body comprising an A-pillar panel, an outer skin panel, which together with an edge of the A-pillar panel delimits a gap, a windshield adjacent to a longitudinal edge of the A-pillar panel and a filler piece having a first portion filling out the gap and a second portion concealing a gap between the longitudinal edge of the A-pillar panel and the windshield.

2. The motor vehicle body according to claim 1, wherein the gap is located on a front lower end of the A-pillar panel.

3. The motor vehicle body according to claim 1, wherein the filler piece is in positive engagement on the A-pillar panel.

4. The motor vehicle body according to claim 3, wherein the positive engagement is formed by way of at least one engagement protrusion of the filler piece and an opening formed in the A-pillar panel for receiving the engagement protrusion.

5. The motor vehicle body according to claim 4, wherein the opening is formed in a flange angled off the edge of the A-pillar panel.

6. The motor vehicle body according to claim 5, wherein the first portion of the filler piece comprises an angular profile having a first leg butting up against the flange and a second leg extending from the flange in the direction of the outer skin panel.

7. The motor vehicle body according to claim 6, wherein the angular profile is U-shaped.

8. The motor vehicle body according to claim 6, wherein the second leg reaches behind the outer skin panel when viewed from outside.

9. The motor vehicle body according to claim 1, wherein the second portion is fixed on the longitudinal edge by way of a bond.

10. The motor vehicle body according to claim 9, wherein the A-pillar panel comprises a flange extending along the longitudinal edge on which the bond adheres.

11. The motor vehicle body according to claim 1, wherein the outer skin panel comprises an engine hood.

12. The motor vehicle body according to claim 1, wherein the filler piece comprises a one-piece molded plastic part.

\* \* \* \* \*